US011245938B2

(12) United States Patent
Braness et al.

(10) Patent No.: US 11,245,938 B2
(45) Date of Patent: **\*Feb. 8, 2022**

(54) SYSTEMS AND METHODS FOR PROTECTING ELEMENTARY BITSTREAMS INCORPORATING INDEPENDENTLY ENCODED TILES

(71) Applicant: DIVX, LLC, San Diego, CA (US)

(72) Inventors: Jason A. Braness, San Diego, CA (US); William David Amidei, San Diego, CA (US); Mayur Srinivasan, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/725,795

(22) Filed: Dec. 23, 2019

(65) Prior Publication Data

US 2020/0137435 A1  Apr. 30, 2020

Related U.S. Application Data

(63) Continuation of application No. 15/693,016, filed on Aug. 31, 2017, now Pat. No. 10,542,303, which is a (Continued)

(51) Int. Cl.
*H04L 29/06* (2006.01)
*H04N 21/2347* (2011.01)
(Continued)

(52) U.S. Cl.
CPC ... *H04N 21/23476* (2013.01); *H04L 63/0428* (2013.01); *H04N 21/2353* (2013.01); (Continued)

(58) Field of Classification Search
CPC ......... H04N 21/23476; H04N 21/2353; H04N 21/44055; H04N 21/435; H04L 63/0428; H04L 9/065; G06F 21/125
See application file for complete search history.

(56) References Cited

U.S. PATENT DOCUMENTS 5,400,401 A    3/1995  Wasilewski et al.
5,574,785 A   11/1996  Ueno et al.
(Continued)

FOREIGN PATENT DOCUMENTS

CA       2237293 A1    7/1997
CN    106664203 B      2/2021
(Continued)

OTHER PUBLICATIONS

Final draft ETSI ES 202 109, V1.1.1, ETSI Standard, Terrestrial Trunked Radio (TETRA); Security; Synchronization mechanism for end-to-end encryption, Oct. 2002, 17 pgs.
(Continued)

*Primary Examiner* — Malcolm Cribbs
(74) *Attorney, Agent, or Firm* — KPPB LLP

(57) ABSTRACT

Systems and methods for partial frame encryption in accordance with embodiments of the invention are disclosed. In one embodiment, the method receives a video bitstream that includes several frames, each frame including several independently encoded compression units within the frame, encrypts a portion of each of several compression units in several frames, and generates an output bitstream that includes the several independently encoded compression units including the encrypted portions of the compression units.

14 Claims, 7 Drawing Sheets

Related U.S. Application Data continuation of application No. 14/821,454, filed on Aug. 7, 2015, now Pat. No. 9,762,937.

(60) Provisional application No. 62/034,714, filed on Aug. 7, 2014.

(51) Int. Cl.

| | |
|---|---|
| *H04N 21/235* | (2011.01) |
| *H04N 21/4405* | (2011.01) |
| *H04N 21/435* | (2011.01) |
| *H04L 9/06* | (2006.01) |

(52) U.S. Cl.
CPC ..... *H04N 21/435* (2013.01); *H04N 21/44055* (2013.01); *H04L 9/065* (2013.01)

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,020,287 B2 | 3/2006 | Unger |
| 7,188,183 B1 | 3/2007 | Paul et al. |
| 7,206,940 B2 | 4/2007 | Evans et al. |
| 7,212,726 B2 | 5/2007 | Zetts |
| 7,242,772 B1 | 7/2007 | Tehranchi |
| 7,274,861 B2 | 9/2007 | Yahata et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,639,921 B2 | 12/2009 | Seo et al. |
| 7,711,052 B2 | 5/2010 | Hannuksela et al. |
| 7,853,980 B2 | 12/2010 | Pedlow, Jr. et al. |
| 7,864,186 B2 | 1/2011 | Robotham et al. |
| 7,945,143 B2 | 5/2011 | Yahata et al. |
| 8,000,344 B1 | 8/2011 | Frick |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,312,079 B2 | 11/2012 | Newsome et al. |
| 8,369,421 B2 | 2/2013 | Kadono et al. |
| 8,649,669 B2 | 2/2014 | Braness et al. |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 9,038,116 B1 | 5/2015 | Knox et al. |
| 10,542,303 B2 | 1/2020 | Braness et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0076237 A1 | 4/2004 | Kadono et al. |
| 2004/0081333 A1* | 4/2004 | Grab ............... H04N 21/63345 382/100 |
| 2004/0088574 A1* | 5/2004 | Walter ................ H04L 63/0428 713/153 |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2005/0013494 A1 | 1/2005 | Srinivasan et al. |
| 2005/0063541 A1 | 3/2005 | Candelore |
| 2005/0076232 A1 | 4/2005 | Kawaguchi |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0013568 A1 | 1/2006 | Rodriguez |
| 2006/0165163 A1 | 7/2006 | Burazerovic et al. |
| 2006/0184790 A1 | 8/2006 | Oliveira et al. |
| 2007/0047645 A1 | 3/2007 | Takashima |
| 2007/0067472 A1 | 3/2007 | Maertens et al. |
| 2007/0083467 A1* | 4/2007 | Lindahl ............ H04N 21/85406 705/50 |
| 2007/0180051 A1 | 8/2007 | Kelly et al. |
| 2008/0040805 A1* | 2/2008 | Yasue ..................... G06F 21/31 726/26 |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0294786 A1 | 11/2008 | Tinker et al. |
| 2009/0003600 A1 | 1/2009 | Chen et al. |
| 2009/0010622 A1 | 1/2009 | Yahata et al. |
| 2009/0013195 A1 | 1/2009 | Ochi et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0178090 A1 | 7/2009 | Oztaskent |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0142915 A1 | 6/2010 | Mcdermott et al. |
| 2011/0010466 A1 | 1/2011 | Fan et al. |

(56) References Cited

U.S. PATENT DOCUMENTS

| | | |
|---|---|---|
| 2011/0058675 A1 | 3/2011 | Brueck et al. |
| 2011/0096828 A1 | 4/2011 | Chen et al. |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0188652 A1 | 8/2011 | Yamaguchi et al. |
| 2011/0197261 A1 | 8/2011 | Dong et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0167132 A1 | 6/2012 | Mathews et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2014/0140253 A1 | 5/2014 | Lohmar et al. |
| 2014/0149557 A1 | 5/2014 | Lohmar et al. |
| 2014/0281481 A1* | 9/2014 | Moroney ............ H04N 21/4825 713/151 |
| 2015/0288530 A1 | 10/2015 | Oyman |
| 2016/0156968 A1 | 6/2016 | Toma et al. |
| 2017/0366829 A1 | 12/2017 | Braness et al. |

FOREIGN PATENT DOCUMENTS

| | | |
|---|---|---|
| EP | 1187483 A2 | 3/2002 |
| EP | 1453319 A1 | 9/2004 |
| EP | 1283640 B1 | 10/2006 |
| EP | 2180664 A1 | 4/2010 |
| EP | 2360923 A1 | 8/2011 |
| EP | 3134995 A1 | 1/2017 |
| JP | 2005341316 A | 12/2005 |
| JP | 2018174533 A | 11/2018 |
| JP | 6666953 B2 | 2/2020 |
| JP | 202078095 A | 5/2020 |
| JP | 6914381 B2 | 7/2021 |
| KR | 20040039852 A | 5/2004 |
| KR | 20060106250 A | 10/2006 |
| KR | 2008007017 A | 7/2008 |
| KR | 20130095324 A | 8/2013 |
| KR | 10-2014-0085539 A | 7/2014 |
| KR | 20140085539 A | 7/2014 |
| KR | 10-2306641 B1 | 9/2021 |
| MX | 2016015022 A | 3/2018 |
| RU | 2328040 C2 | 6/2008 |
| WO | 2000049762 A2 | 8/2000 |
| WO | 2000049763 A1 | 8/2000 |
| WO | 0104892 C | 1/2001 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2013063094 A1 | 5/2013 |

OTHER PUBLICATIONS

Information Technology—MPEG Systems Technologies—Part 7: Common Encryption in ISO Base Media File Format Files (ISO/IEC 23001-7), Apr. 2015, 24 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG—DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al, "Improved Selective Encryption Techniques for Secure Transmission of MPEG Video Bit-Streams", Image Processing, 1999. ICIP 99. Proceedings. 1999 International Conference on, vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.

(56) References Cited

OTHER PUBLICATIONS

Beker et al., "Cipher Systems, The Protection of Communications", 1982, 40 pgs.
Bloom et al., "Copy Protection for DVD Video", Proceedings of the IEEE, vol. 87, No. 7, Jul. 1999, pp. 1267-1276.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 16, 2002.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
Mccanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Unknown, "Information Technology—Coding of Audio-Visual Objects—Part 2 Visual", International Standard, ISO/IEC 14496-2, Third edition, Jun. 1, 2004, pp. 1-706.
Van Deursen et al., "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", researcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

(56) References Cited

OTHER PUBLICATIONS

Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

* cited by examiner

| Example of Signaling of Tiles in PPS | Descriptor |
|---|---|
| pic_parameter_set_rbsp( ) { | |
| ... | |
| tiles_enabled_flag | u(1) |
| entropy_coding_sync_enabled_flag | u(1) |
| entropy_slice_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| } | |

FIG. 7

SYSTEMS AND METHODS FOR PROTECTING ELEMENTARY BITSTREAMS INCORPORATING INDEPENDENTLY ENCODED TILES

CROSS REFERENCE TO RELATED APPLICATIONS

This application is a continuation of U.S. application Ser. No. 15/693,016 filed on Aug. 31, 2017, entitled "Systems and Methods for Protecting Elementary Bitstreams Incorporating Independently Encoded Tiles" to Braness et al., which application is a continuation of U.S. application Ser. No. 14/821,454 filed on Aug. 7, 2015, entitled "Systems and Methods for Protecting Elementary Bitstreams Incorporating Independently Encoded Tiles" to Braness et al., which application claims the benefit of U.S. Provisional Patent Application No. 62/034,714 filed on Aug. 7, 2014, entitled "Systems and Methods for Protecting Elementary Bitstreams Incorporating Independently Encoded Tiles" to Braness et al., disclosures of which are incorporated herein by reference in their entireties.

FIELD OF INVENTION

The present invention relates to the field of encryption and decryption of video information. More specifically, the present invention is directed to methods and systems for generating a protected stream of compressed digital video using partial frame encryption.

BACKGROUND

Existing digital video compression techniques are complex processes which rely upon a variety of techniques in transforming (i.e., "encoding") a unit of uncompressed video data into an encoded form. Such encoding permits fewer bits to be used in representing the content of the original uncompressed video data. The resultant encoded data is capable of being transformed using a reverse process (i.e., "decoding") yielding a digital video unit of data that is either visually similar or identical to the original data. Modern techniques of digital video compression can achieve very high levels of compression.

The Motion Pictures Experts Group (MPEG) and the International Standards Organization (ISO) have produced various international standards specifying the video compression and decompression algorithms for video coding. These standards include MPEG-1, MPEG-2, MPEG-4, H.261, H.264, and the newer High-Efficiency Video Coding (HEVC) standard, which has significantly improved compression efficiency relative to its predecessors. In particular, HEVC is able to achieve a 2× compression ratio at a same subjective quality as compared to the prior H.264 standard. To achieve these compression optimizations, the HEVC standard has introduced several new tools designed specifically for parallel processing of video content on multi-core processor architectures. In particular, many smartphone and tablet architectures available on the market now utilize multi-core processors and thus are capable of playing back HEVC content using their multi-core architectures. Furthermore, with the growth of video traffic over networks, the HEVC standard provides certain tools that alleviate some of the bandwidth requirements for distributing high quality content.

Protecting the distribution of digital content from piracy and other types of unlawful distribution is yet another concern for content providers. The term Digital Rights Management (DRM) is utilized to describe access control technologies that are used to control access to and/or copying of digital content. DRM systems typically involve the use of cryptographic information to control access to or protect a piece of content. Content protection is typically achieved using cryptographic information such as (but not limited to) one or more encryption keys to encrypt content.

Various types of encryption schemes currently exist that may be used to protect data. In the digital world, encryption is often implemented by using a collection of bits of some length known as a "key" to execute a predictable transform on a unit of data. This yields another unit of data that cannot be "read" without knowledge of the key used to execute the transform. The process of encryption is only easily reversible to the extent the encrypting key or its counterpart (e.g., a "public" key) is available for use in transforming or "decrypting" the encrypted data back into the original form. Video data is often encrypted using a symmetric block cipher conforming to, for example the Data Encryption Standard (DES) or Advanced Encryption Standard (AES). The particular techniques used to encrypt digital content may yet consume further processing resources that need to be taken into account with respect to the encoding and distribution of content across a network.

SUMMARY OF THE INVENTION

Systems and methods for partial frame encryption in accordance with embodiments of the invention are disclosed. In one embodiment, the method receives a video bitstream that includes several frames, each frame including several independently encoded compression units within the frame, encrypts a portion of each of several compression units in several frames, and generates an output bitstream that includes the several independently encoded compression units including the encrypted portions of the compression units.

In a further embodiment or the invention, a compression unit is an independently decodable portion of a particular frame of video such that it does not depend upon another compression unit within the particular frame in order to be decoded.

In still a further embodiment of the invention, the method further parses a metadata header to identify locations of compression units within a frame of video, and encrypts a portion of the video bitstream based on the locations of the compression units.

In yet still a further embodiment of the invention, the method encrypts the portion of each of the plurality of compression units by determining that compression units are enabled based on information within a header associated with the video bitstream.

In yet a further embodiment of the invention still, the method further includes encrypting a portion of each compression unit in a frame of video.

In yet another embodiment of the invention, the portion is selected from the group consisting of i) a first N bytes of the compression unit, ii) a last N bytes of the compression unit, iii) a middle portion of N bytes within the compression unit and iv) a pattern of N bytes within the compression unit.

In still yet another embodiment of the invention, the compression units are tiles within a High-Efficiency Video Coding (HEVC) standard and the video bitstream is encoded based on the HEVC standard.

In yet another embodiment of the invention further still, the method further includes parsing a Picture Parameter Set (PPS) of the HEVC video bitstream to identify the structure of the tiles within the video bitstream, and encrypt portions of the tiles based on the structure.

In another embodiment of the invention again, the method further encrypts the portion of each of the several compression units using a common encryption format (CENC) to encrypt the portions.

Still another embodiment of the invention includes a content encoder that includes: a processor configured to communicate with a memory, where the memory contains an encoder application, where the encoder application directs the processor to: receive a video bitstream including several frames, each frame including several independently encoded compression units within the frame, encrypt a portion of each of several compression units in several frames, and generate an output bitstream including the several independently encoded compression units including the encrypted portions of the compression units.

In another embodiment of the invention, a compression unit is an independently decodable portion of a particular frame of video such that it does not depend upon another compression unit within the particular frame in order to be decoded.

In still another embodiment invention, the encoder application further directs the processor to parse a metadata header to identify locations of compression units within a frame of video, and encrypt a portion of the video bitstream based on the locations of the compression units.

In still yet another embodiment of the invention, encrypting the portion of each of the several compression units includes determining that compression units are enabled based on information within a header associated with the video bitstream.

In still yet another embodiment again, the encoder application further directs the processor to encrypt a portion of each compression unit in a frame of video.

In another embodiment of the invention again, the portion is selected from the group consisting of i) a first N bytes of the compression unit, ii) a last N bytes of the compression unit, iii) a middle portion of N bytes within the compression unit and iv) a pattern of N bytes within the compression unit.

In another further embodiment of the invention, the compression units are tiles within a High-Efficiency Video Coding (HEVC) standard and the video bitstream is encoded based on the HEVC standard.

In yet another embodiment of the invention again, the encoder application further directs the processor to parse a Picture Parameter Set (PPS) of the HEVC video bitstream to identify the structure of the tiles within the video bitstream, and encrypt portions of the tiles based on the structure.

In still a further embodiment of the invention again, encrypting the portion of each of the plurality of compression units includes using a common encryption format (CENC) to encrypt the portions.

In another embodiment of the invention, a content decoder includes: a processor configured to communicate with a memory, where the memory contains a decoder application, where the decoder application directs the processor to receive a video bitstream including several frames, each frame including several independently encoded compression units within the frame, decrypt a portion of each of several compression units in several frames, and generate an output decoded video for playback.

In yet another embodiment of the invention, a compression unit is an independently decodable portion of a particular frame of video such that it does not depend upon another compression unit within the particular frame in order to be decoded.

In yet another embodiment of the invention again, the decoder application further directs the processor to parse a metadata header to identify locations of compression units within a frame of video, and decrypt a portion of the video bitstream based on the locations of the compression units.

In still another embodiment of the invention again, decrypting the portion of each of the several compression units includes determining that compression units are enabled based on information within a header associated with the video bitstream.

In still another further embodiment of the invention, the decoder application further directs the processor to decrypt a portion of each compression unit in a frame of video.

In yet another embodiment of the invention again, the portion is selected from the group consisting of i) a first N bytes of the compression unit, ii) a last N bytes of the compression unit, iii) a middle portion of N bytes within the compression unit and iv) a pattern of N bytes within the compression unit.

In a further embodiment of the invention still, the compression units are tiles within a High-Efficiency Video Coding (HEVC) standard and the video bitstream is decoded based on the HEVC standard.

In another embodiment of the invention still, the decoder application further directs the processor to parse a Picture Parameter Set (PPS) of the HEVC video bitstream to identify the structure of the tiles within the video bitstream, and decrypt portions of the tiles based on the structure.

In yet still another embodiment of the invention, decrypting the portion of each of the plurality of compression units includes using a common encryption format (CENC) to decrypt the portions.

BRIEF DESCRIPTION OF FIGURES

FIG. 7 illustrates an example of a syntax structure for tiles in an HEVC video in accordance with embodiments of the invention.

DETAILED DESCRIPTION

Figure 1:
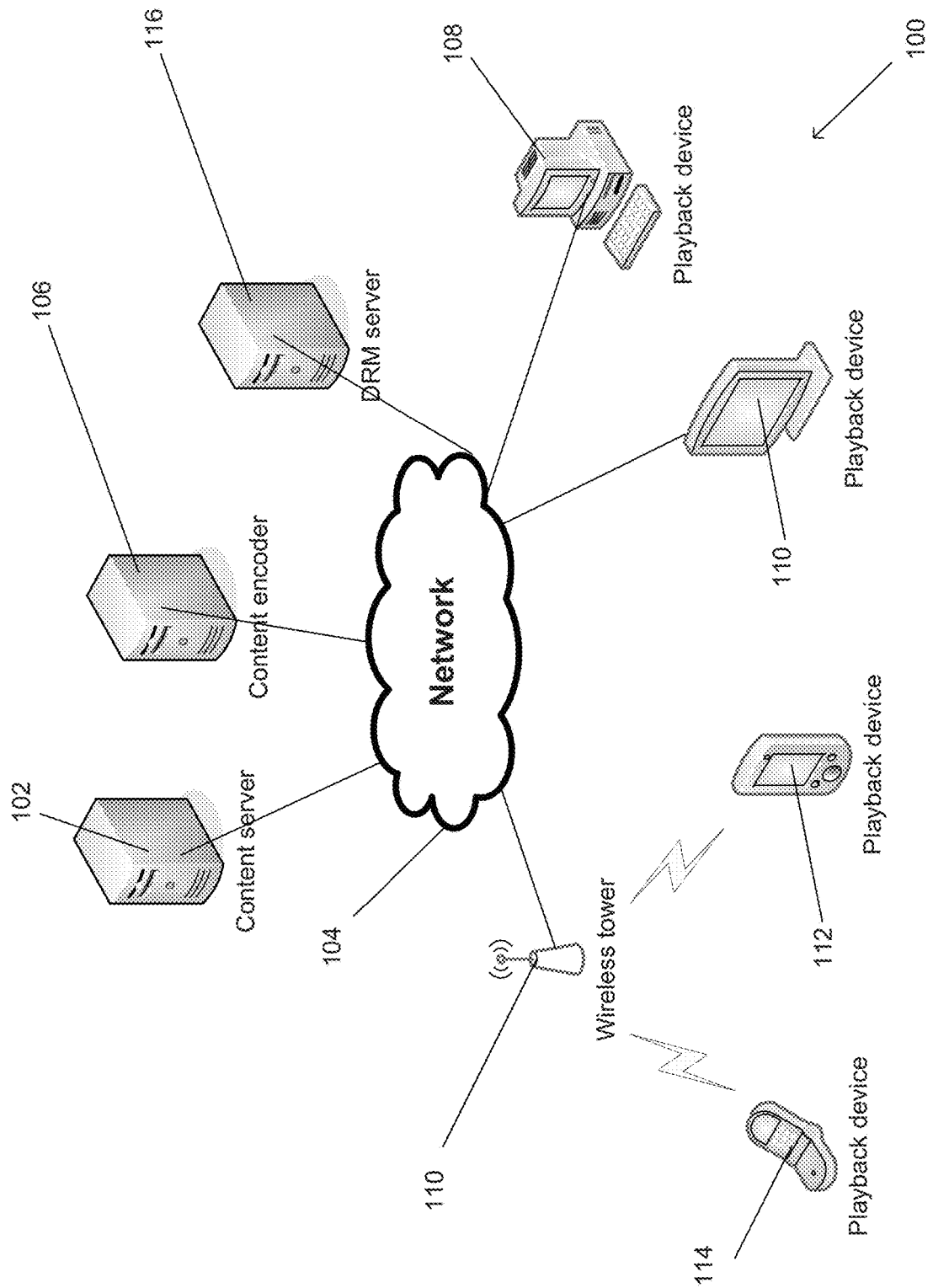
FIG. 1 is a system diagram of a video encoding and delivery system in accordance with embodiments of the invention.

As described above, different techniques may be used to encrypt content, and each may consume different amounts of processing resources in addition to the processing costs associated with the compression technique (e.g., H.264 or HEVC) being utilized to compress or encode the video content. Accordingly, many embodiments of the invention are able to achieve efficiency in generating a protected compressed video sequence that has encrypted frames by encrypting only portions of a frame, rather than the entire frame. These techniques may generally be referred to as "partial frame encryption" since they encrypt only portions of a frame. The one or more portions that are encrypted within a frame of video can be specified within the frame by a start location and length. Often, this information may be provided within a header associated with the frame and used by a decoder to locate the encrypted portions of the frame for decryption.

In many video compression formats such as H.264/MPEG-4 AVC (Advanced Video Coding), there are dependencies within a frame and across multiple frames (due to compression algorithms). Because of the dependencies, when a portion that is encrypted cannot be decrypted and therefore cannot be played back properly, other portions within the frame or in other frames that depend on the encrypted portion also cannot be played back. Thus, in an AVC encoded bitstream, encrypting the beginning x number of bytes of a frame or sequence of units often is sufficient to prevent the decoding of many other parts of the frame or other units.

Many embodiments may utilize the ISO/IEC 23001-7: 2012 Common Encryption Scheme (CENC) standard for encryption, which is an industry encryption standard that specifies standard encryption and key mapping methods that can be utilized by one or more digital rights and key management systems (DRM systems) to enable decryption of the same file using different DRM systems. The scheme allows for encrypting multiple discontinuous portions of a frame.

Some video compression formats such as High Efficiency Video Coding (HEVC) allow for portions of a frame to be independently encoded and decoded, without reference to or dependence from information in other portions, which enables the simultaneous parallel processing of different portions of a frame video. One such feature designed to enable parallel processing is "tiles" in HEVC. In particular, tiles can be used for encoding and decoding portions of a frame simultaneously by different processors, by dividing a picture into rectangular areas (tiles), where each tile consists of a number of coding tree units (CTUs).

Tiles can be contained within a single NAL (Network Abstraction Layer) unit or slice. Similar independently decodable portions of a frame can be referred to across different encoding formats as compression units (i.e., tiles in HEVC). Compression units enable parallelism when decoding the bitstream as they can be processed independently of each other. In an HEVC encoded stream with tiles enabled, if merely the first x bytes of the video NAL units or frame were encrypted, other portions (tiles) may be fully decodable without having to decrypt the encrypted portion(s) because of their independence from the encrypted portion(s).

Thus, in many embodiments, the security of an encoded bitstream having tiles (or other compression units) can be improved by encrypting at least a portion of multiple tiles within a frame to render more of the frame unrecoverable without decrypting the encrypted portions. In several embodiments, an encoder and/or encoding process can be designed to decode at least part of the bitstream to determine where tiles are located and encrypt portions of tiles. The encoder may acquire information concerning the structure and/or location of tiles in order to encrypt information within multiple tiles and protect more of the bitstream from being decoded without being decrypted. Methods for acquiring this information regarding tiles (or other independently decodable units) can include parsing a NAL unit header to determine the start location of one or more tiles. Systems and methods for partial frame encryption of compression units in accordance with embodiments of the invention are discussed further below.

System Architecture for Partial Encoding and Playing Back Video Using Partial Frame Encryption As described above, many new compression standards provide new tools that allow for the parallel processing (i.e., encoding and decoding) of video content on multi-core architectures. These tools include, for example, the use of "tiles" in the HEVC standard, among other types of similar, independently decodable compression units that may be utilized to partition a frame of video content into separate decodable units. As will be described throughout this application, compression units (e.g., tiles in HEVC) may generally refer to partitioned and/or independently decodable portions of a single frame of video for a given encoding standard. Furthermore, "tiles" are a type of compression unit that has been introduced within the HEVC standard. Although many of the examples below describe partial frame encryption of tiles based on video compressed according to the HEVC standard, partial frame encryption may be used to encrypt video that has been compressed according to any other standards which uses similar types of compression units to partition a video frame as appropriate to the requirements of specific applications in accordance with embodiments of the invention.

Furthermore, in order to protect digital content that has been compressed using independently decodable compression units, certain encryption techniques may be used that apply partial frame encryption to one or more portions of the compression units (i.e., tiles) within a frame of video. In particular, in the newer standards (e.g., HEVC) that have been designed to allow for the independent decoding of compression units within a frame of video, it may no longer be sufficient to encrypt only a portion of a total video frame (i.e., video picture) based on the compression standard design that other portions would have inter-frame dependencies that would require the proper decryption of the encrypted frame. As described above, within these older compression standards, because of the dependencies between different portions of a single video frame, when a portion that is encrypted cannot be decrypted and therefore cannot be played back properly, other portions within the frame or in other frames that depend on the encrypted portion also cannot be played back. Thus, in many embodiments, partial frame encryption may be applied to portions of one or more compression units within a frame of video. A system for encoding video content using partial frame encryption in accordance with an embodiment of the invention is illustrated in FIG. 1.

The system 100 includes a content encoder 102 configured to encode source media into encoded video. In several embodiments, the content encoder may encode content using a compression standard that allows for the parallel processing of the content (e.g., HEVC standard) by generating, for example, compression units (e.g., tiles) within each frame of video that allow for the independent encoding/decoding of portions of a frame without reference to other portions of the frame of video. In particular, in several embodiments, the content encoder may encode the content using the HEVC standard to encode frames of video content.

The HEVC standard may also generate one or more independently decodable tiles for each frame of video.

In addition to encoding frames of video based on a compression standard (e.g., HEVC), in many embodiments, the content encoder 106 may further encrypt portions of the video content to protect the content from unlawful distribution. In order to reduce the overhead costs associated with encrypting video content, in many embodiments, the content encoder 106 encodes the video content using partial frame encryption whereby only a portion of one or more compression units (i.e., tiles) within a frame of video are encrypted (rather than encrypting the entire frame of video content). In some embodiments, the content encoder encrypts the starting x number of bytes of each tile within a frame of video. Other embodiments may encrypt different portions of a tile, including the x bytes located somewhere within the bitstream, the ending x bytes, or any other combination of bytes within the tile as appropriate to the requirements of specific application. In certain embodiments, the content encoder may encrypt a same portion of every tile in a frame. In other embodiments, the content encoder may encrypt different portions of different tiles. In several embodiments, the content encoder may encrypt portions of only certain tiles (e.g., less than all tiles) within a frame of video. As can readily be appreciated, container files that contain the encrypted video can include a separate DRM track that contains information concerning the location of the encrypted portions of tiles within a frame and/or the cryptographic information utilized to encrypt all or each of the encrypted portions.

In some embodiments, the content encoder 106 stores the content in a Matroska (MKV) container file. The Matroska container is a media container developed as an open standard project by the Matroska non-profit organization of Aussonne, France. The Matroska container is based upon Extensible Bindary Meta Language (EBML), which is a binary derivative of the Extensible Markup Language (XML). Decoding of the Matroska container is supported by many consumer electronic (CE) devices. In other embodiments, any of a variety of container file formats can be utilized including (but not limited to) the MP4 container file format specified by the Motion Picture Experts Group as MPEG-4 Part 14 as appropriate to the requirements of specific applications.

In some embodiments, after the content encoder 106 has compressed and/or encrypted a video sequence, the content encoder 106 uploads the encoded video to the content server 102.

In many embodiments, the content server 102 facilitates the distribution of the source media to one or more playback devices 108-114. Content servers 102 in accordance with several embodiments of the invention can be responsible for storing protected content for distribution to playback devices. In many embodiments, the content server receives and processes download requests from the variety of playback devices 108-114 that seek to download the encoded video. In some embodiments, a device may request either to (i) download the entire file, or (ii) receive a streamed video for playback in either a progressive or adaptive streaming mode. When the distribution server receives a download request from a playback device, it can provide the playback device with the encoded video for storage and/or playback.

A downloaded video file may include one or more headers that contain data describing the structure of the compression units (e.g., tiles in HEVC encoded video) within frames of video. The headers may include pointers to the start location of one or more tiles. In some embodiments, the location of tiles within an encoded HEVC video sequence may be specified in a picture parameter structure (PPS) that provides information regarding the tile structure within one or more frames of video. In some embodiments, the tiles may be fixed at certain locations within a frame while in other embodiments, the tiles may be at different locations for different frames of video. A decoder on a playback device may use this information to determine the portions of a frame that need to be decrypted in order to play back the video file.

In some embodiments, the content server 102 receives stream requests from a variety of playback devices and subsequently streams the encoded video to the playback devices for progressive playback and/or as part of an adaptive bitrate streaming system. In several embodiments, the variety of playback devices can use HTTP or another appropriate stateless protocol to request streams via a network 104 such as the internet. In several embodiments, a variety of playback devices can use RTSP whereby the distribution server records the state of each playback device and determines the video to stream based upon instructions received from the playback devices and stored data describing the state of the playback device.

In several embodiments, the DRM server 116 (digital rights management) facilitates the authorization and access to the source media, including managing the keys required to encrypt/decrypt the source media.

DRM servers 116 in accordance with certain embodiments of the invention can be responsible for storing protected streams and/or files of content for distribution (e.g. streaming and/or downloading) to playback devices. DRM servers can also store common cryptographic information utilized to protect the content. In several embodiments, the common cryptographic information is identified utilizing an identifier associated with the common cryptographic information and a piece of content.

In the illustrated embodiment, playback devices include personal computers 108-110, and mobile phones 112-114. In other embodiments, playback devices can include consumer electronics devices such as DVD players, Blu-ray players, televisions, set top boxes, video game consoles, tablets, and other devices that are capable of connecting to a server via HTTP and playing back encoded video.

In the illustrated embodiment, the content encoder, content server and DRM server are server application configured to execute on server computer hardware. In other embodiments, the content encoder, content server and DRM server can be any processing device including a processor and having sufficient resources to perform the encryption, distribution, and digital rights management of source media including (but not limited to) video, audio, and/or subtitles. Although a specific architecture is shown in FIG. 1 any of a variety of architectures can be utilized that enable playback devices to request encoded video with partial frame encryption as appropriate to the requirements of specific applications in accordance with embodiments of the invention.

Figure 2A:
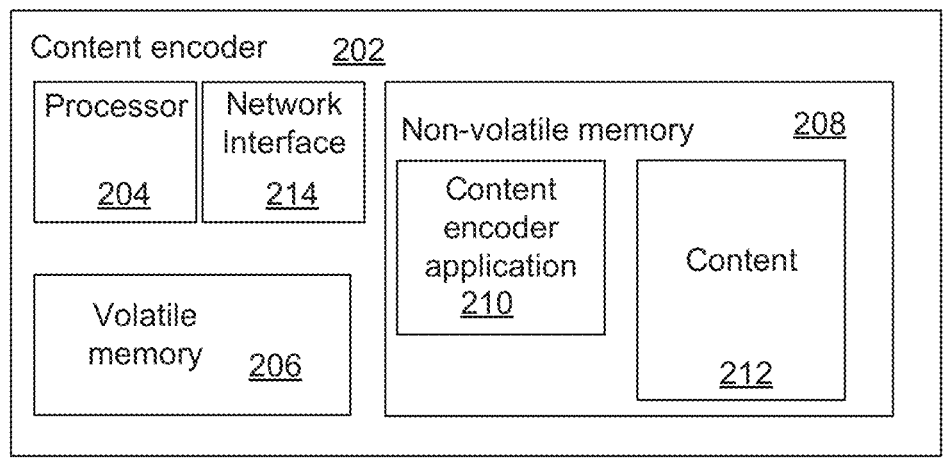
FIG. 2A conceptually illustrates a content encoder configured to generate partially encrypted content in accordance with embodiments of the invention.

The basic architecture of a content encoder 202 in accordance with an embodiment of the invention is illustrated in FIG. 2A. The content encoder 202 includes a processor 204 in communication with non-volatile memory 208, volatile memory 206, and a network interface 214. In the illustrated embodiment, the non-volatile memory includes a content encoder application 210 that configures the processor to encode content 212. In several embodiments, the content encoder application 210 encrypts content using partial frame encryption such that only portions of one or more compression units (e.g., tiles) are encrypted within a frame of video, rather than the entire frame, to reduce the overhead associated with the encryption of the compressed video.

In several embodiments, the network interface 214 may be in communication with the processor 204, the volatile memory 206 and/or the non-volatile memory 208. Although a specific content encoder architecture is illustrated in FIG. 2A, any of a variety of architectures including architectures where the content encoder application is located on disk or some other form of storage and is loaded into volatile memory at runtime can be utilized to implement content encoders in accordance with embodiments of the invention.

Figure 2B:
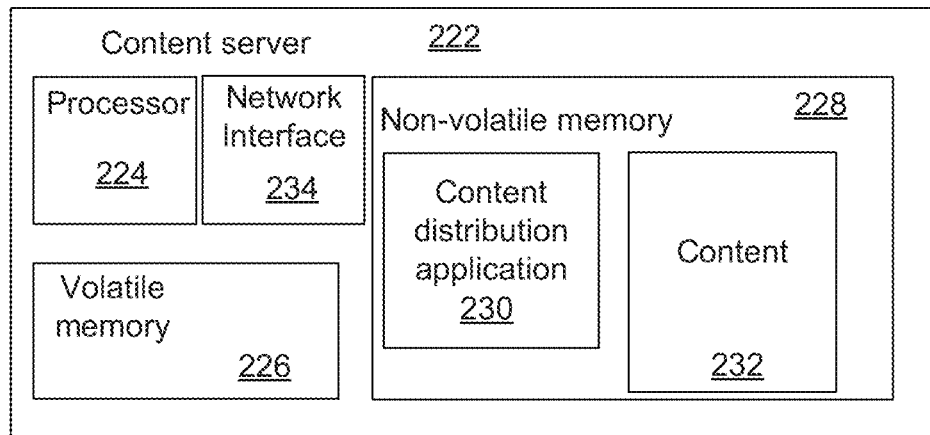
FIG. 2B conceptually illustrates a content server configured to manage and distribute partially encrypted content in accordance with embodiments of the invention.

The basic architecture of a content server 222 in accordance with an embodiment of the invention is illustrated in FIG. 2B. The content server 222 includes a processor 224 in communication with non-volatile memory 228, volatile memory 226, and a network interface 234. In the illustrated embodiment, the non-volatile memory includes a content distribution application 230 that configures the processor to distribute content 232. In several embodiments, the network interface 234 may be in communication with the processor 224, the volatile memory 226 and/or the non-volatile memory 228. Although a specific content server architecture is illustrated in FIG. 2B, any of a variety of architectures including architectures where the content distribution application is located on disk or some other form of storage and is loaded into volatile memory at runtime can be utilized to implement content servers in accordance with embodiments of the invention.

Figure 2C:
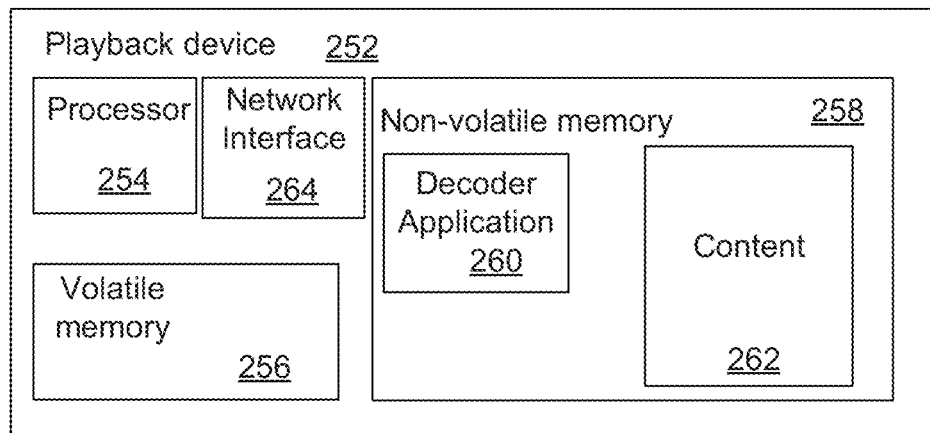
FIG. 2C conceptually illustrates a playback device configured to receive and play back partially encrypted content in accordance with embodiments of the invention.

The basic architecture of a playback device in accordance with an embodiment of the invention is illustrated in FIG. 2C. The playback device 252 includes a processor 254 in communication with non-volatile memory 258, volatile memory 256, and a network interface 240. In the illustrated embodiment, the non-volatile memory includes a decoder application 260 that configures the processor to decode content 262. In some embodiments, the decoder application 260 uses information provided within video container file and/or video stream to identify the location of compression units within a frame of video and decrypts only certain portions of the compression units in order to decode the video.

In several embodiments, the network interface 264 may be in communication with the processor 254, the volatile memory 256, and/or the non-volatile memory 258. Although a specific playback device architecture is illustrated in FIG. 2C, any of a variety of architectures including architectures where the decoder application is located on disk or some other form of storage and is loaded into volatile memory at runtime can be utilized to implement playback devices in accordance with embodiments of the invention.

Systems and Methods for Partial Frame Encryption

Figure 3:
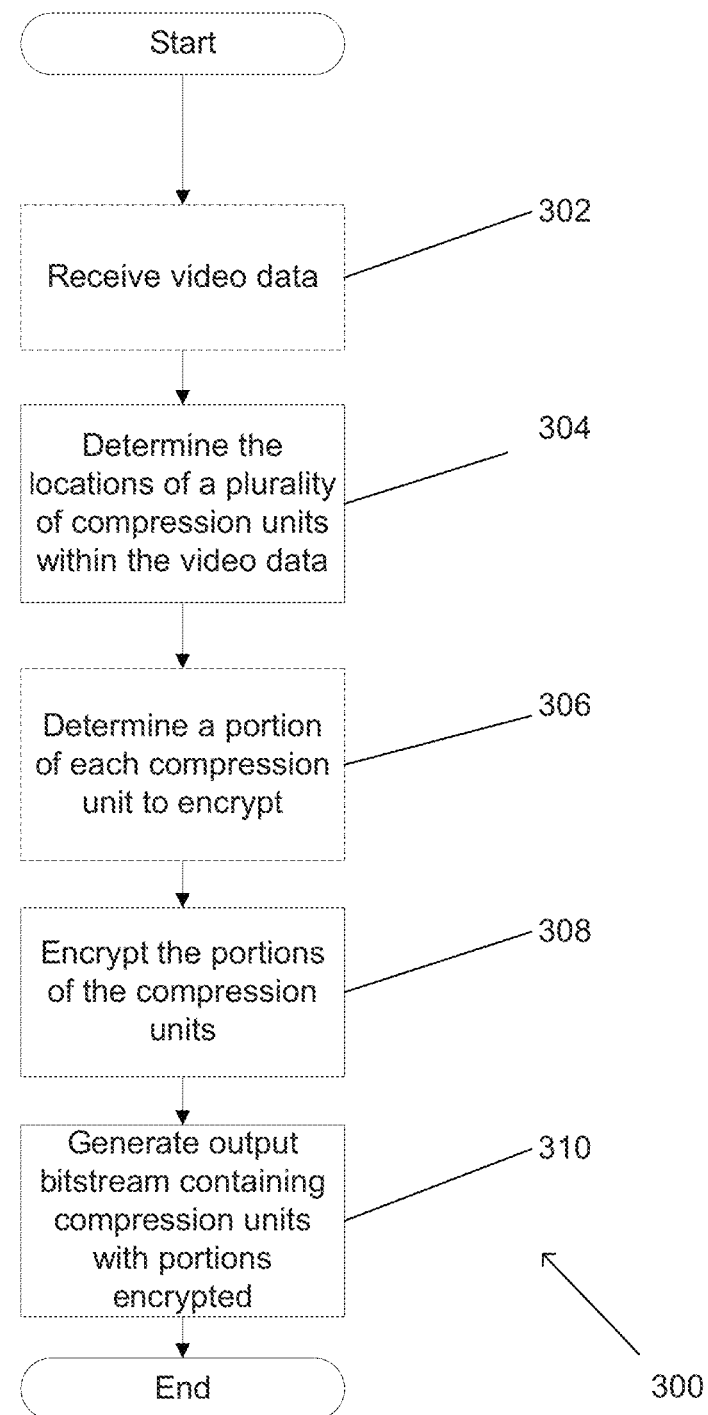
FIG. 3 illustrates a process for partially encrypting content in accordance with embodiments of the invention.

As described above, some video compression formats (e.g., HEVC) allow for portions of a frame (e.g., compression units or tiles) to be independently encoded and decoded, without reference to or dependence from information in other portions of the frame (or other frames). These independently decodable portions of a frame can be referred to across different encoding formats as compression units. Thus during encryption of a stream with independent compression units, if merely the first x bytes of the frame were encrypted, other portions (compression unites or tiles) may be fully decodable without having to decrypt the encrypted portions of the compression units because of their independence from the encrypted compression units. Thus, the security of an encoded bitstream having tiles (or other compression units) can be improved by encrypting at least a portion of multiple tiles within a frame to render more of the frame unrecoverable without decrypting the encrypted portions. A process for partial frame encryption of compression units of a video bitstream in accordance with an embodiment of the invention is illustrated in FIG. 3.

The process receives (at 302) video data. In some embodiments, the process may download video data from one or more content distributors. In other embodiments, the process may stream video data during video playback.

The process determines (at 304) locations of a plurality of compression units within the video data. The locations may be determined based on information provided by one or more header(s) associated with a frame of video. In some embodiments, the header may provide information regarding the start location of each compression unit within the frame. In some embodiments, the location of each compression unit may be fixed within each frame of video and thus may not need to be identified by a header. For example, an encoder may be pre-programmed with information regarding the structure of a video sequence.

The process determines (at 306) a portion of each compression unit within a frame of video to encrypt. In some embodiments, the process determines a fixed x bytes of each compression unit should be encrypted. In several embodiments, the process determines different portions of different compression units based on characteristics of the compression units. In other embodiments, the process may encode the middle or last x number of bytes in one or more compression units for a frame of video. In certain embodiments, the process may not encrypt certain frames of video while only encrypting portions of other frames of video. As can readily be appreciated, the specific portions of particular frames that are encrypted and the manner of encryption is typically dependent upon the requirements of the application.

The process encrypts (at 308) the portions of the compression units. In some embodiments, the process encrypts the portions using a standard DES and/or AES cipher. Other embodiments may use other encryption mechanisms as appropriate to the requirements of specific applications.

The process generates (at 310) an output bitstream containing compression units with portions that have been encrypted. The process then ends.

Although a specific process for encrypting portions of compression units is described in FIG. 3, any of a variety of processes may be utilized to encrypt portions of compression units as appropriate to the requirements of specific applications in accordance with embodiments of the invention.

Overview of HEVC Standard

Figure 6:
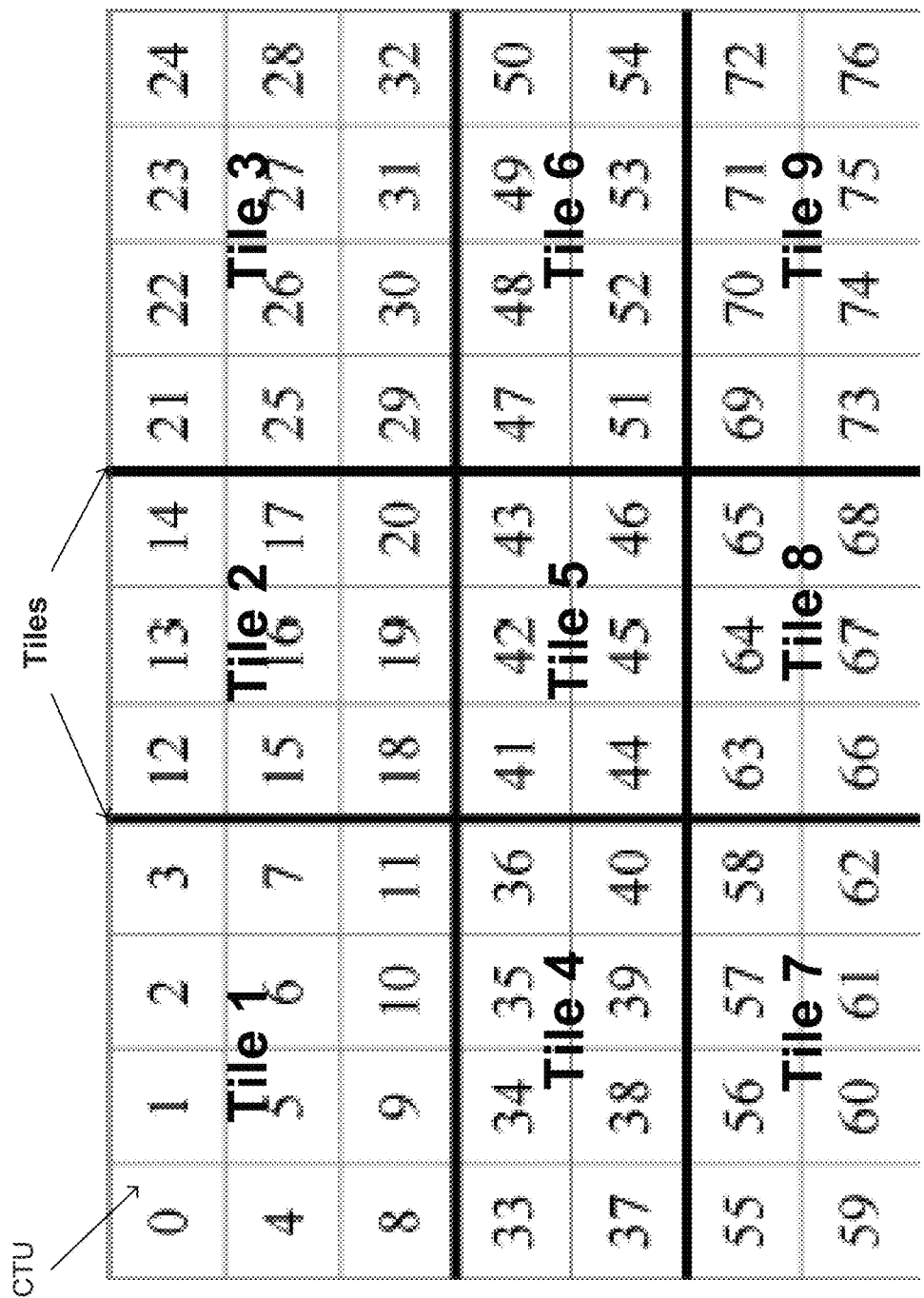
FIG. 6 illustrates an example of tiles within a frame of video in accordance with embodiments of the invention.

As described above, the HEVC video compression standard includes several new tools designed for playback of video content using multi-core architectures that support parallel processing. The tools include Wavefront Parallel Processing (WPP) and tiles, in addition to slice structures. When WPP and/or tiles are used, the video bitstream corresponding to one picture may be packetized into independently decodable subsets of bitstreams. In particular, HEVC includes independently decodable tiles that partition a frame of video into rectangular regions of certain sizes. An example of tiles within a frame of video in accordance with embodiments of the invention is illustrated in FIG. 6. In particular, FIG. 6 is a diagram illustrating an example of evenly partitioning a frame in the horizontal and the vertical dimensions into nine tiles, tile 1 at the top left corner to tile 9 at the bottom right corner. Each tile includes a coding tree unit.

Tile related parameters may be signaled in a Picture Parameter Set (PPS) in HEVC. Within a video sequence, different pictures may be allowed to use different PPS's. The tile parameters may change from picture to picture in the same video sequence. In most video applications, the number of tiles and the locations of the tiles are likely to remain the same within a video sequence (e.g., a series of pictures), however, situations may arise where not only the configurations of tiles may be allowed to change from picture to picture in the same video sequence, but also the grouping of tiles may be allowed to change from picture to picture.

FIG. 7 illustrates an example of a syntax structure for tiles in Picture Parameter Set (PPS) in an HEVC video. If a tiles_enabled_flag is turned on, then the number of tiles in each dimension may be signaled. If the tiles are uniformly sized (e.g., if uniform_spacing_flag is 1), then no additional information may be signaled. The width and height of the tiles may be signaled. For example, as shown in FIG. 7, num_tile_columns_minus1 and num_tile_rows_minus1 may be set to 2 and uniform_spacing_flag may be set to 1.

An encoder may change how the tiles are partitioned from fame to frame by the encoder signaling a new PPS with new tile partition parameters. In many embodiments, tiles need not remain equally sized compared to each other, or the same size compared to the same tile at an earlier instance. In particular, the encoder may signal a new PPS with new tile partition parameters that would apply to a new set of one or more frames.

Partial Frame Encryption in HEVC

Figure 4:
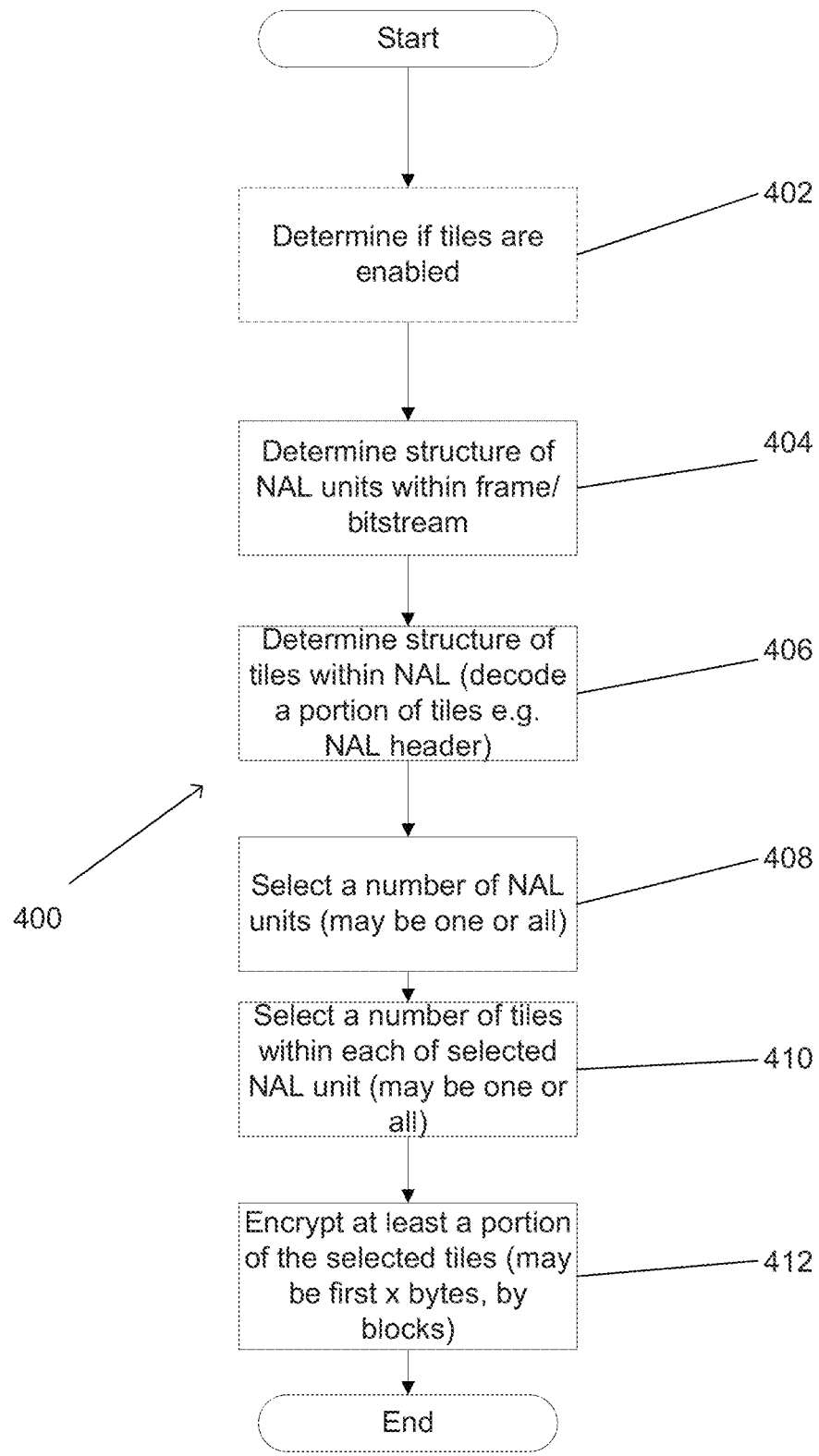
FIG. 4 illustrates a process for partially encrypting content in accordance with embodiments of the invention.

As described above, the HEVC standard introduces certain tools that support high level parallel processing. In particular, HEVC includes tiles, which allow a frame to be split into rectangular regions, which can then be independently encoded and decoded. A frame may be split uniformly or non-uniformily as tiles. An entry point for each tile may be specified in a slice header. In order to allow for partial encryption of a video file using the HEVC standard, many embodiments of the invention may partially encrypt multiple tiles in order to encrypt the video content. A process for partial encryption of HEVC tiles in accordance with an embodiment of the invention is illustrated in FIG. 4.

The process determines (at 402) if tiles are enabled. In many embodiments, when tiles are enabled, a bit stream may contain entry point offsets that indicate the start position of each picture partition which is necessary for each core to immediately access the partition.

The process determines (at 404) the structure of NAL units within a frame and/or bitstream.

The process determines (at 406) the structure of tiles within a NAL unit. In some embodiments, the process parses a NAL header to determine the start locations of each tile within a frame of video. In some embodiments, HEVC tiles may partition a picture into rectangular regions of certain sizes. The parameter structure for tiles may be specified in a Picture Parameter Set (PPS), video usability information (VUI), and/or a supplemental enhancement information (SEI) message, in HEVC. An example of a PPS in HEVC is illustrated in FIG. 7. If a tiles_enabled_flag is turned on, then the number of tiles in each dimension may be signaled. In some embodiments, if the tiles are uniformily sized (e.g., if uniform_spacing_flag is 1), then no additional information may be signaled. The PPS may also signal the width and height of tiles, The process selects (at 408) a number of NAL units. In some embodiments, the process may select all of the NAL units. In certain embodiments, the process may select one or more NAL units.

The process selects (at 410) a number of tiles within each of the selected NAL units. In some embodiments, an encoder may change how the tiles are partitioned from picture to picture by the encoder signaling a new PPS with new tile partition parameters. FIG. 7 illustrates an example of signaling tiles in a PPS. In some embodiments, the tiles may be different sizes compared to each other, or different sizes compared to the same tile at an earlier instance. In some embodiments, the encoder may signal a new PPS with new tile partition parameters for each new picture, or when the tile partitions change from a previous picture.

The process encrypts at least a portion of the selected tiles. In some embodiments, the process may encrypt the first x number of bytes, ending x bytes, or some x number of bytes that lie within a certain portion of the bitstream of the tile. In several embodiments, the process may encrypt a number of blocks within the tile. Other embodiments may encrypt other portions of a tile as appropriate to the requirements of specific applications. In many embodiments, the process encrypts the portions of tiles using a common encryption format (CENC) that uses a common specification regarding how to encrypt bitstreams. The CENC specifies industry standard encryption and key mapping methods that can be used by DRM systems to enable decryption of files. The scheme operates by defining a common format for the encryption related metadata necessary to decrypt protected streams. The scheme leaves the details of rights mappings, key acquisition and storage, DRM compliance rules, among various other considerations, up to the DRM system supporting the CENC scheme. Furthermore, in many embodiments, encryption information may be stored within the MKV containers.

The process then ends. Although a specific process for encrypting a portion of tiles in an HEVC video content are described in FIG. 4, any of a variety of processes may be utilized to encrypt portions of tiles as appropriate to the requirements of specific applications in accordance with embodiments of the invention.

Decoding Partially Encrypted Video

Figure 5:
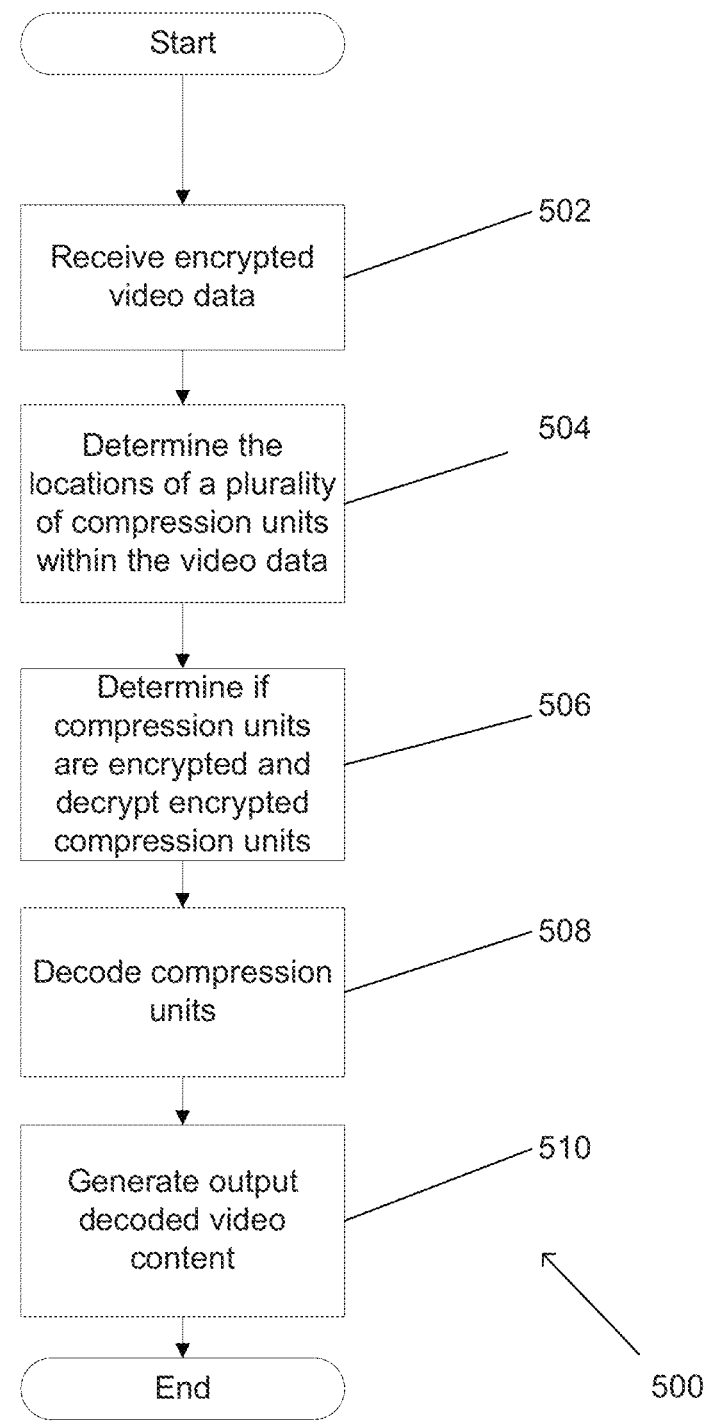
FIG. 5 illustrates a process for decoding and playing back partially encrypted content in accordance with embodiments of the invention.

A process for decoding partially encrypted video in accordance with an embodiment of the invention is illustrated in FIG. 5.

The process receives (at 502) encrypted video data. In some embodiments, the process may download, stream, and/or stream to download video content from a content provider. In other embodiments, the video data may be stored on a disk or obtained by any other mechanism as appropriate to the requirements of specific applications.

The process determines (at 504) the locations of a plurality of compression units (e.g., tiles in HEVC) within the video data. In some embodiments, the locations of the tiles may be fixed within one or more frames of video. In other embodiments, the locations of tiles may change between frames, or sets of frames. The location of tiles may be determined based on information contained within a PPS corresponding to a frame. In particular, the process may parse the PPS to identify the particular bytes within a tile that have been encrypted.

The process determines (at 506) if compression units are encrypted and decrypts the encrypted compression units. In some embodiments, the process may obtain a decryption key for decrypting the encrypted content. The decryption key may be obtained based on authorizations received from a DRM service associated with the content.

The process decodes (at 508) the compression units. In many embodiments, the process decodes the content based on the particular compression standard used to encode the video (e.g. HEVC video).

The process generates (at 510) output decoded video for playback. The process then ends.

Although a specific process for decrypting portions of compression units in video content are described in FIG. 5, any of a variety of processes may be utilized to decrypt portions of compression units in video content as appropriate to the requirements of specific applications in accordance with embodiments of the invention.

Although the present invention has been described in certain specific aspects, many additional modifications and variations would be apparent to those skilled in the art. It is therefore to be understood that the present invention may be practices otherwise than specifically described. Thus, embodiments of the present invention should be considered in all respects as illustrative and not restrictive.

Furthermore, the foregoing discussion discloses and describes merely exemplary embodiments of the present invention. One skilled in the art will readily recognize from such discussion and from the accompanying drawings that various changes, modifications and variations may be made therein without departing from the spirit and scope of the invention. Therefore, it is intended that the invention may not be limited to the particular embodiment disclosed, but that the invention will include all embodiments falling within the scope of the appended claims.

What is claimed is:

1. A non-transitory machine readable medium containing processor instructions, where execution of the instructions by a set of one or more processors causes the set of processors to perform a process comprising:
   receiving an encoded video bitstream comprising a plurality of frames, each frame comprising a plurality of independently encoded compression units within the frame, wherein each independently encoded compression unit is a tile;
   for each frame of the plurality of frames:
      receiving a metadata header identifying the locations of the plurality of independently encoded compression units within the frame;
      receiving encryption information identifying locations of encrypted portions of the plurality of independently encoded compression units in the frame;
      decrypting the encrypted portions of each of a plurality of compression units in the frame based on the received metadata header and the received encryption information; and
   upon decrypting the encrypted portions of the plurality of compression units of the frame, decoding, by a plurality of processors in parallel, the frame with the decrypted plurality of compression units.

2. The non-transitory machine readable medium of claim 1, wherein a compression unit is an independently decodable portion of a particular frame of video such that it does not depend upon another compression unit within the particular frame in order to be decoded.

3. The non-transitory machine readable medium of claim 1, wherein decrypting the portion of each of the plurality of compression units comprises determining that compression units are in a state of being enabled based on information within a header associated with the video bitstream.

4. The non-transitory machine readable medium of claim 1, wherein each portion of the encrypted portions is selected from the group consisting of i) a first N bytes of the compression unit, ii) a last N bytes of the compression unit, iii) a middle portion of N bytes within the compression unit and iv) a pattern of N bytes within the compression unit.

5. The non-transitory machine readable medium of claim 1, wherein the compression units are tiles within a High-Efficiency Video Coding (HEVC) standard and the video bitstream is encoded based on the HEVC standard.

6. The non-transitory machine readable medium of claim 5, wherein the metadata header includes a Picture Parameter Set (PPS) of the HEVC video bitstream to identify a structure of the tiles within the video bitstream.

7. The non-transitory machine readable medium of claim 1, wherein decrypting the encrypted portions of each of the plurality of compression units comprises using a common encryption format (CENC) to decrypt the portions.

8. A content decoder comprising:
   a memory;
   a processor configured to communicate with the memory, where the memory contains instructions;
   wherein execution of the instructions by the processor causes the processor to:
      receive an encoded video bitstream comprising a plurality of frames, each frame comprising a plurality of independently encoded compression units within the frame, wherein each independently encoded compression unit is a tile;
      for each frame of the plurality of frames:
         receiving a metadata header identifying the locations of the plurality of independently encoded compression units within the frame;
         receive encryption information identifying locations of encrypted portions of the plurality of independently encoded compression units in the frame;
         decrypt the encrypted portions of each of a plurality of compression units in the frame based on the received metadata header and the received encryption information; and
      upon decrypting the encrypted portions of the plurality of compression units of the frame, decode, by a plurality of processors in parallel, the frame with the decrypted plurality of compression units.

9. The content decoder claim 8, wherein a compression unit is an independently decodable portion of a particular frame of video such that it does not depend upon another compression unit within the particular frame in order to be decoded.

10. The content decoder of claim 8, wherein decrypting the portion of each of the plurality of compression units comprises determining that compression units are in a state of being enabled based on information within a header associated with the video bitstream.

11. The content decoder of claim 8, wherein the portion is selected from the group consisting of i) a first N bytes of the compression unit, ii) a last N bytes of the compression unit, iii) a middle portion of N bytes within the compression unit and iv) a pattern of N bytes within the compression unit.

12. The content decoder of claim 8, wherein the compression units are tiles within a High-Efficiency Video Coding (HEVC) standard and the video bitstream is decoded based on the HEVC standard.

13. The content decoder claim 12, wherein the metadata header includes a Picture Parameter Set (PPS) of the HEVC video bitstream to identify a structure of the tiles within the video bitstream.

14. The content decoder claim 8, wherein decrypting the encrypted portions of each of the plurality of compression units comprises using a common encryption format (CENC) to decrypt the portions.

* * * * *

UNITED STATES PATENT AND TRADEMARK OFFICE
CERTIFICATE OF CORRECTION

PATENT NO. : 11,245,938 B2
APPLICATION NO. : 16/725795
DATED : February 8, 2022
INVENTOR(S) : Jason A. Braness, William David Amidei and Mayur Srinivasan Page 1 of 1

It is certified that error appears in the above-identified patent and that said Letters Patent is hereby corrected as shown below:

In the Claims

Column 13: Claim 3, Line 61, replace "the portion" with --the encrypted portions--; Claim 3, Line 62, replace "that compression" with --that the compression--.

Column 14: Claim 7, Line 16, replace "the portions" with --the encrypted portions--; Claim 9, Line 44, replace "decoder claim 8" with --decoder of claim 8--; Claim 10, Line 50, replace "the portion" with --the encrypted portions--; Claim 10, Line 51, replace "that compression" with --that the compression--; Claim 11, Line 54, replace "wherein the portion" with --wherein each portion of the encrypted portions--; Claim 13, Line 64, replace "decoder claim 12" with --decoder of claim 12--.

Column 15: Claim 14, Line 1, replace "decoder claim 8" with --decoder of claim 8--; Claim 14, Line 4, replace "the portions" with --the encrypted portions--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*